United States Patent [19]

Schneider et al.

[11] Patent Number: 5,523,151

[45] Date of Patent: Jun. 4, 1996

[54] MAGNETIC RECORDING MEDIA

[75] Inventors: Norbert Schneider, Altrip; August Lehner, Roedersheim-Gronau; Ursula Klein, Limburgerhof; Werner Lenz, Bad Duerkheim; Werner Balz, Limburgerhof; Albert Kohl, Laumersheim; Guenter Bettinger, Schifferstadt, all of Germany

[73] Assignee: BASF Magnetics GmbH, Mannheim, Germany

[21] Appl. No.: 994,259

[22] Filed: Dec. 21, 1992

[30] Foreign Application Priority Data

Dec. 21, 1991 [DE] Germany ............ 41 42 635.5
Dec. 21, 1991 [DE] Germany ............ 41 42 643.6

[51] Int. Cl.$^6$ .............. B32B 5/16; B32B 9/04; G11B 5/66; B05D 5/12
[52] U.S. Cl. ........... 428/323; 428/331; 428/694 B; 428/694 BN; 428/447; 428/900; 427/128; 427/130
[58] Field of Search ............ 428/694 B, 323, 428/694 BM, 331, 900, 447; 427/128, 130

[56] References Cited

U.S. PATENT DOCUMENTS

| 4,320,159 | 3/1982 | Ogawa et al. ............ 428/64 |
| 4,603,080 | 7/1986 | Takazawa et al. ............ 428/331 |
| 5,068,152 | 11/1991 | Maro ............ 478/408 |

FOREIGN PATENT DOCUMENTS

| 1106959 | 5/1961 | Germany. |
| 2753694 | 1/1980 | Germany. |
| 3149764 | 6/1983 | Germany. |
| 3227164 | 1/1984 | Germany. |
| 3227163 | 1/1984 | Germany. |
| 60163809 | 8/1985 | Japan. |

OTHER PUBLICATIONS

English-language abstract of JP 60 163 809.

*Primary Examiner*—Leszek Kiliman
*Attorney, Agent, or Firm*—Keil & Weinkauf

[57] ABSTRACT

Magnetic recording media are obtained by preparing a dispersion of anisotropic magnetic material and additives in a solution of a polymeric binder in an organic solvent, applying the dispersion as a layer to a nonmagnetizable substrate, then orienting the anisotropic magnetic material in a magnetic field and solidifying the applied magnetic layer, and the magnetic layer contains water-repellent polysilica and, if required, a highly viscous polysiloxane.

2 Claims, No Drawings

MAGNETIC RECORDING MEDIA

The present invention relates to magnetic recording media obtained by preparing a dispersion of anisotropic magnetic material and conventional additives in a solution of a polymeric binder in an organic solvent, applying the dispersion as a layer to a nonmagnetizable substrate, then orienting the anisotropic magnetic material in a magnetic field and solidifying the applied magnetic layer.

Magnetic recording media which are used in modern audio or video recording and playback apparatuses have to meet requirements in many respects. In addition to the high requirements with respect to the recording and playback properties, for the use of audio tapes, video tapes and computer tapes, which are constantly being improved, constant adaptation and improvement is required particularly with regard to the mechnical properties and the reduction in elutable substances of the recording media. The magnetic layers must be very flexible and have high resilience and high tensile strength. Furthermore, in order to avoid drops in output level, a reduction in the coefficients of friction, an increase in the abrasion resistance and resistance to wear and an improvement in the stability under high temperature and humidity conditions are necessary. Since, furthermore, magnetic layers of the recording media have to be increasingly smooth to the same extent that higher and higher frequencies are recorded, there is a problem that such smooth magnetic layers block during playing even at slightly elevated temperatures about 30° C. and high atmospheric humidity. This makes the magnetic recording media unusable, they smear, and deposits form on the recording and playback heads.

To avoid these defects, it is necessary, apart from using particularly suitable magnetic pigments, to choose all the materials present in the magnetic layers so that the magnetic layers have the particularly high magnetization in the recording direction and, in the case of the required smooth surfaces, also have the mechanical properties which are essential. It is precisely the improvement of the stated properties, such as uniform surface roughness in conjunction with good residual induction and orientation and the guaranteeing of excellent magnetic properties in one and the same magnetic material that are dependent to a high degree on the production of the magnetic layer, of the binder used and of the additives. Additives are primarily the lubricants, water-repellents and dispersants, which have a substantial effect on the electroacoustic, magnetic and mechanical properties of the magnetic recording media.

In the case of high quality magnetic recording media, reducing the surface roughness of the magnetic layer is particularly important since a particularly good tape/head contact is required for the resolution of very short wavelengths. This results in the high requirements which are set for the frictional properties or wear resistance of the tapes, since damage to the magnetic layer immediately leads to drops in output level.

Very many methods have been adopted to date for solving these problems, such as the addition of water-repellents, subsequent application of lubricants to the magnetic layer, an increase in the surface hardness of the magnetic layer by crosslinking, and the addition of nonmagnetic pigments, binder combinations of from two to four film-forming components which, if necessary, can additionally be crosslinked. The large number of measures proposed to date often have considerable deficiencies in terms of process engineering, ie. they meet the requirements only insufficiently, if at all. Particularly high requirements are increasingly being set for the running properties of the magnetic recording media under extreme climatic conditions, particularly at high atmospheric humidity and high temperature. Attempts to solve these problems often involved the addition of small amounts of specific lubricants or fillers, which were admixed during dispersing of the magnetic materials or during the preparation of the magnetic materials. Examples of such additives are fatty acids or isomerized fatty acids, such as stearic acid or salts thereof with metals of the first to fourth main groups of the Periodic Table of elements, amphoteric electrolytes, such as lecithin, and fatty esters, fatty amides, silicone oils or carbon black. Particularly in combination, these products result in very good running properties under the usual climatic conditions. Under extreme climatic conditions, such tapes are suitable only to a limited extent for operation at high atmospheric humidity and up to 85° C., even with the use of special binder systems as employed, for example, for audio and video tapes having an extended dynamic range. In particular, very good coefficients of friction can be achieved under conventional climatic conditions by combining special magnetic materials and conventional finely divided precipitated silicas with zinc salts of fatty acids. However, increased abrasion and blocking of the individual tape layers occur at high temperatures of up to 85° C. and also at high atmospheric humidity. In the case of magnetic recording media whose magnetic material consists of chromium dioxide, this effect of the atmospheric humidity on the magnetic layer leads to a further disadvantage: partial decomposition of the chromium dioxide after storage in water.

It is an object of the present invention to provide, by a simple and reliable measure, magnetic recording media which have little roughness and which are improved with regard to wear resistance of the layer and stability thereof under high temperature and humidity conditions, even at up to 85° C. Furthermore, as a result of these improvements, drops in output level should be avoided and blocking of the tapes under extreme operating conditions should be prevented.

We have found that this object is achieved by magnetic recording media obtained by preparing a dispersion of anisotropic magnetic material and conventional additives in a solution of a polymeric binder,in an organic solvent, applying the dispersion as a layer to a nonmagnetizable substrate, then orienting the anisotropic magnetic material in the magnetic field and solidifying the applied magnetic layer, if a finely divided polysilicic acid rendered hydrophobic with chemically bound carbon is present in an amount of from 0.3 to 5% by weight, based on the amount of magnetic material, in the magnetic layer.

In an advantageous embodiment of the novel magnetic recording media, the finely divided polysilicic acid rendered hydrophobic with chemically bound carbon is present in combination with from 0.1 to 1.5% by weight, based on the amount of magnetic material, of a highly viscous polysiloxane.

Hitherto the preference in making lacquers was for low molecular weight or chemically modified silicone oils. High molecular weight dimethylsiloxanes are substantially insoluble and incompatible, resulting in a strong tendency toward pitting and a hammer finish effect. It was all the more surprising that, in combination with water-repellent silica, the leveling defects, evident from audio output fluctuations at from 10,00 to 40,000 Hz, were substantially improved. When low molecular weight silicone oils or modified silicone oils are used, there are very particular disadvantages in the running behavior, for example wow and flutter and stability under high temperature and humidity conditions.

The high molecular weight polysiloxanes used according to the invention are dimethylsiloxanes having a viscosity of from greater than 10,000 to 500,000mPa.s, preferably, because they are more readily processible, from greater than 10,000 to 100,000 mPa.s, most advantageously from 20,000 to 80,000 mPa.s. The advantageous amount of the silicone oil is from 0.1 to 1.5, preferably from 0.15 to 0.75, % by weight, based on the magnetic pigment.

The water-repellent polysilica present in the novel magnetic recording medium has a chemically bound carbon in an amount of from 0.5 to 5, prefearbly from 1.8 to 3.2, % by weight, a pH, measured in equal amounts of methanol and water, of from 7.5 to 12, preferably from 8 to 7, and a BET surface area of from 70 to 400, preferably from 90 to 200, $m^2/g$. This hydrophobic polysilica is not wettable with water.

By this addition of the polysilica for the production of magnetic layers, its amount preferably being from 0.3 to 2% by weight, the running behavior both at high atmospheric humidity and high temperature is substantially improved, even during storage at 85° C.

In the production of the novel magnetic recording media, it has furthermore been found that the amount of the conventional lubricants added can be reduced by up to 50% without particular disadvantages.

The composition and production of the novel magnetic recording media are known.

Preferably used magnetic materials are finely divided acicular gamma-iron(II) oxide having a mean particle size of from 0.1 to 2 μm, in particular from 0.1 to 0.9 μm, or acicular chromium dioxide having the same particle structure as stated for iron oxide. Further suitable materials are gamma-iron(II) oxide doped with heavy metals, in particular with cobalt, and finely divided metal alloys of iron, cobalt and/or nickel. Finely divided chromium dioxide is particularly suitable. Pigment mixtures are also suitable.

The binders forming the magnetizable layer consist of at least 40% by weight of polyurethanes. For example, solvent-containing polyurethane elastomers, as described, for example, in DE-B 11 06 959 or in DE-B 27 53 694, are suitable for this purpose. Further suitable polyurethanes are disclosed in DE-A 32 27 163 and 32 27 164. The polyurethanes can be used as sole binders or, preferably, as mixtures with other polymers (for example polyvinyl formals, phenoxy resins or PVC copolymers). Preferably from 10 to 40% by weight of the second binder component are added. In the case of these binders, it is particularly advantageous if additional dispersants can be partly or completely dispensed with.

Any crosslinking of the magnetic recording media which may be required depending on the binder system and tape property profile involves reacting the polyurethanes or polyurethane binder mixtures with polyisocyanates. A large number of organic di-, tri- or polyisocyanates or isocyanate prepolymers having a molecular weight of up to 10,000, preferably from 500 to 3,000, can be used for the crosslinking. Polyisocyanates which carry more than 2 NCO groups in the molecule are preferred. Polyisocyanates based on toluene diisocyanate, hexamethylene diisocyanate or isophorone diisocyanate, which are formed by polyaddition with di- or triols or by biuret and isocyanurate formation, have proven particularly suitable. An adduct of toluene diisocyanate with trimethylolpropane and diethylene glycol is particularly advantageous. The amount of polyisocyanate used must be adapted to the particular binder system.

The solvent used is water, a cyclic ether, such as tetrahydrofuran and dioxane, or a cyclic ketone, such as cyclohexanone, depending on the binder employed. The polyurethanes are also soluble in other strongly polar solvents, such as dimethylformamide, N-methylpyrrolidone, dimethyl sulfoxide or ethylglycol acetate. It is also possible to mix the stated solvents with aromatics, such as toluene or xylene, and esters, such as ethyl or butyl acetate.

In general, further additives for improving the magnetic layer are added to the dispersions of magnetic material and binder. Examples of such additives are fatty acids, polycarboxylic acids, mono-, di- or polysulfonic acids or phosphoric acids, mixtures thereof, esters or salts with metals of the first to fourth groups of the Periodic Table, lecithins and fluorocarbons, as well as fillers, such as carbon black, graphite, quartz powder and/or nonmagnetizable powder based on silicate or on iron oxide. The total amount of additives is usually less than 10% by weight, based on the magnetic layer.

The amount of polysilicic acid which is typical for the novel magnetic recording media is achieved by adding these substances before or at the end of the dispersing procedure. Pigment pastes which are mixed with the magnetic dispersion are also suitable. This results in a good and uniform distribution. If the magnetizable layer is produced using further conventional additives which, apart from other effects, such as improving the frictional properties and the leveling, also promote the dispersing, the advantageous properties are retained by the addition of the novel polysalicic acid.

The magnetizable layers are produced in a known manner. For this purpose, the magnetic material is dispersed with the binder used and sufficient solvent in a dispersing apparatus, for example a tubular ball mill or a stirred ball mill with or without the addition of further additives. To obtain the advantageous binder/pigment ratio, they may be added to the mixture either in a solid state or in the form of from 10 to 60% strength solutions or from 20 to 60% strength dispersions. It has proven advantageous to continue the dispersing until an extremely fine dispersion of a magnetic material has been achieved, which may take from 1 to 5 days. Subsequent repeated filtration gives a completely homogeneous magnetic dispersion. Any crosslinking agents required are added to the dispersion prior to coating.

The magnetic dispersion is then applied to a nonmagnetic substrate with the aid of a conventional coating apparatus, for example by means of a knife coater. Suitable nonmagnetic substrates are the conventional substrates, in particular of from 6 to 36 μm. Before the still liquid coating mixture is dried on the substrate, which is advantageously effected at from 50° to 100° C. in the course of from 0.2 to 5 minutes, the anisotropic magnetic particles are oriented along the intended recording direction by the action of a magnetic field. The magnetic layers can then be calendered and compacted on conventional apparatuses by being passed between heated and polished rollers, if necessary with the use of pressure and at from 20° to 100° C., preferably from 40° to 80° C. The thickness of the magnetic layer is in general from 1 to 20 μm, preferably from 2 to 12 μm.

The novel magnetic recording media have improved mechanical properties while retaining the good recording and playback quality. The improved resistance to wear and stability under high temperature and humidity conditions, the avoidance of drops in output level and the prevention of blocking during storage at up to 85° C. are noteworthy.

The Examples and Comparative Experiments which follow illustrate the invention.

EXAMPLE 1

In a steel ball mill of conventional design containing steel balls as grinding medium, 100 parts by weight of ferromagnetic chromium dioxide having a mean particle size of 0.5 μm and a length/width ratio of 4:1 were dispersed for 72 hours with 33.9 parts by weight of a 16.5% strength solution of a polyurethane elastomer, 5.6 parts by weight of a 20% strength solution of a polyvinyl formal, consisting of 82% of vinylformal units and 12% of vinyl acetate and vinyl alcohol units, 0.5 part by weight of N-tallow fatty-1,3-diaminooleate, 2 parts by weight of Zn stearate, 0.6 part by weight of linseed oil fatty acid, 87 parts by weight of a 1:1 mixture of tetrahydrofuran and dioxane and 1 part by weight of a water-repellent silica (BET of 90 m$^2$/g).

A mixture of 50.5 parts by weight of the 16.5% strength polyurethane elastomer solution, 8.33 parts by weight of the 20% strength polyviny formal solution, 28.8 parts by weight of 1:1 tetrahydrofuran/dioxane and 0.25 part by weight of an oleic acid/stearic acid mixture were then added to this premilled dispersion and dispersing was continued for a further 2 hours.

6.7 parts by weight of a 50% strength triisocyanate, consisting of 3 mol of toluene diisocyanate and 1 mol of trimethylolpropane were added to the magnetic tape dispersion thus obtained, vigorous stirring was carried out and the mixture was then filtered through a filter having a pore size of 3 μm.

A 7.5 μm thick polyethylene terephthalate film was coated with this dispersion using a knife coater and, after passing through a magnetic field, the coating was then dried at 80° C. The magnetic layer was compacted and calendered by being passed between heated rollers (70° C., nip pressure 200 kg/cm). The resulting magnetic layer was 5 μm. The film coated in this manner was then cut into 3.81 mm wide tapes.

EXAMPLE 2

The procedure was as described in Example 1, except that the amount of water-repellent polysilica was reduced from 1 to 0.5 parts by weight.

COMPARATIVE EXPERIMENT 1

The procedure was as described in Example 1, except that no water-repellent polysilica was added.

COMPARATIVE EXPERIMENT 2

The procedure was as described in Example 1, except that hydrophilic polysilica was used.

EXAMPLE 3

The procedure was as described in Example 1, except that 0.5 part by weight of a linseed oil fatty acid was additionally introduced.

COMPARATIVE EXPERIMENT 3

The procedure was as described in Example 3, except that hydrophilic silica having a BET of 100 m$^2$/g was used instead of water-repellent polysilica.

EXAMPLE 4

The procedure was as described in Example 1, except that 0.5 part by weight of dimethylsiloxane (viscosity 60,000 mPa.s) was used in addition to the water-repellent polysilica.

EXAMPLE 5

The procedure was as described in Example 4, except that the amount of water-repellent polysilica was reduced from 1 to 0.5 part by weight.

COMPARATIVE EXPERIMENT 4

The procedure was as described in Example 4, except that no water-repellent polysilica was added.

COMPARATIVE EXPERIMENT 5

The procedure was as described in Example 4, except that a hydrophilic polysilica was used.

EXAMPLE 6

The procedure was as described in Example 4, except that 0.5 part by weight of a linseed oil fatty acid was additionally introduced.

COMPARATIVE EXPERIMENT 6

The procedure was as described in Example 6, except that hydrophilic silica having a BET of 100 m$^2$/g was used instead of water-repellent polysilica.

COMPARATIVE EXPERIMENT 7

The magnetic layer according to Comparative Experiment 6 was rendered water-repellent by means of stearyl isocyanate.

EXAMPLE 7

The procedure was as described in Example 6, except that, instead of the dimethylsiloxane having a viscosity of 60,000 mPa.s, one having a viscosity of 500,000 mPa.s was used.

COMPARATIVE EXPERIMENT 8

The procedure was as described in Example 6, except that, instead of the dimethylsiloxane having a viscosity of 60,000 mPa.s, one having a viscosity of 100 mPa.s was used.

COMPARATIVE EXPERIMENT 9

Example 7 was repeated without the addition of dimethylsilicone oil.

COMPARATIVE EXPERIMENT 10

The procedure was as described in Example 7, but without the addition of the water-repellent polysilica.

The tapes resulting from the Examples and Comparative Experiments were subjected to the following tests:
Test 1
Tendency to Block After Storage at High Temperatures This test determines the force necessary to overcome any blocking forces between layer and film during unwinding.

For this purpose, the tape to be tested was incorporated in a compact cassette (Type C 90), wound under a defined torque and stored for 8 hours at 85° C. after which the resulting blocking forces were measured without braking.

The maximum retaining force occurring in the immediate vicinity of the hub (stated in cN) serves as a comparative value.

Test 2

Wow and Flutter After Storage at High Temperatures

Compact cassettes having poor running properties tend to have a higher wow and flutter after storage at high temperatures. The first playback after storage at high temperatures is particularly critical here. The wow and flutter behavior according to IEC 386, a measure of speed fluctuations, was measured (modulation [%] stated).

Test 3

Eluate Value

The eluate value in mg/l was determined according to DIN 38,414, page 4.

Test 4

Stability Under High Temperature and Humidity Conditions

Testing of the abrasion resistance of test tapes with regard to deposits on recording/playback head (RPH) and capstan after storage and testing under high temperature and humidity conditions. Determination of the blocking rate.

Storage Conditions

Storage time: 4 weeks

Storage conditions: 40° C., 93% r.h.

Test specimen: 10 units of C 60, C 90 or C 120

Test Conditions

Test apparatus: Use of 10 drives, each having a recording/playback head with MU metal head contact surface Tape speed: 9.5 cm/sec Test specimen: The cassettes stored under the conditions described above Test time: 10 cassette cycles Test conditions: 30° C., 93% r.h., acclimatization for at least 8 hours under the test conditions The compact cassettes removed after storage under the storage conditions are operated in the playback mode on the test apparatus. After the tape has passed through completely, the compact cassette is turned over and started again. This process is repeated up to the 10th cycle, and the individual compact cassettes always remain on the same test apparatus.

The deposits on the recording/playback head and capstan are evaluated separately in each case after the first and tenth cycle (ratings 1 to 6, where 1 means no abrasion and 6 means pronounced abrasion).

Test 5

Output Level Stability

Testing of the output level stability with test tapes at 100 cycles and evaluation of the abrasion resistance of the test tape by assessing the deposits on the erase head (EH), recording/playback head (RPH) and capstan.

Test Conditions:

Test apparatus: Trio (Kenwood) 3-head recorder

Tape speed: 4.75 cm/sec

Recorded frequency: 8 kHz

Number of cassette cycles: 100

Level chart recorder: from Bruel and Kjear, Type 2305

Test conditions: 23° C., 50% r.h., acclimatization for at least 1 hour under the test conditions During each cycle, an 8 kHz signal is recorded at a recording level of −7 dB, corresponding to the particular bias setting, and is registered again behind the tape by the level chart recorder.

The number of cycles which show no drops in output level >2 dB and >6 dB is determined.

The deposits on the erase head, the recording/playback head and the capstan are evaluated on the basis of an available Table (ratings 1 to 6).

Test 6

Coating Characteristics

Here, the surface of the magnetic layer is investigated for defects, such as pitting or an orange peel structure.

The results obtained for the magnetic recording media according to Examples 1 to 3 and Comparative Experiments 1 to 3 are shown in Table 1 and those for Examples 4 to 7 and Comparative Experiments 4 to 10 are shown in Table 2.

TABLE 1

| Experiments | Test 1 | Test 2 | Test 3 | Test 4 10 cycles RPH/capstan | Test 5 Cycles for drop of >2 dB | >6 dB | Deposits EH | RPH | Capstan |
|---|---|---|---|---|---|---|---|---|---|
| Example 1 | 1.3 cN | 1.4% | 2.3 g/l | 2/2.5 | >100 | >100 | 2.5 | 2.5 | 2.5 |
| Example 2 | 1.5 cN | 1.8% | 2.6 g/l | 2.5/2.5 | >100 | >100 | 2.5 | 3.0 | 2.5 |
| Comparative Experiment 1 | 2.0 cN | blocked | 4.0 g/l | 3.5/4.0 | 63 | 85 | 3.5 | 3.5 | 3.5 |
| Comparative Experiment 2 | 1.5 cN | 3% | 5.6 g/l | 3.0/3.5 | 80 | >100 | 3.0 | 3.5 | 3.5 |
| Example 3 | 1.4 cN | 1.5% | 1.2 g/l | 2.5/2.0 | >100 | >100 | 2.5 | 2.0 | 2.0 |
| Comparative Experiment 3 | 1.5 cN | 1.9% | 3.5 g/l | 3.5/3.5 | 67 | 94 | 3.0 | 3.0 | 3.5 |

TABLE 2

| | Test 1 | Test 2 | Test 3 | Test 4 | Cycles for drop of | | Test 5 Deposits | | | Test 6 Coating characteristics |
|---|---|---|---|---|---|---|---|---|---|---|
| | | | | | >2 dB | >6 dB | EH | RPH | Capstan | |
| Example 4 | 0.8 cN | 1.0% | 4.8 g/l | 1.5/1.5 | >100 | >100 | 1.5 | 1.0 | 2.0 | No defects |
| Example 5 | 0.8 cN | 1.3% | 5.2 g/l | 1.0/2.0 | >100 | >100 | 1.5 | 1.5 | 2.0 | No defects |
| Comparative Experiment 4 | 1.0 cN | 1.3% | 5.3 g/l | 1.5/2.0 | >100 | >100 | 1.5 | 2.0 | 2.5 | Slight defects |
| Example 6 | 0.7 cN | 1.2% | 0.6 g/l | 1.0/1.5 | >100 | >100 | 1.5 | 1.5 | 1.5 | No defects |
| Comparative Experiment 5 | 1.0 cN | 1.5% | 1.1 g/l | 2.0/2.5 | 93 | >100 | 2.0 | 1.5 | 2.0 | Slight defects |
| Comparative Experiment 6 | 1.3 cN | 1.7% | 2.5 g/l | 2.0/3.0 | >100 | >100 | 1.5 | 2.0 | 2.5 | Slight defects |
| Comparative Experiment 7 | 2.3 cN | blocked | 1.8 g/l | 3.5/3.5 | 23 | 49 | 3.5 | 4.0 | 4.0 | Slight defects |
| Comparative Experiment 8 | 1.6 cN | squeals (not measurable) | 1.6 g/l | 2.5/3.0 | >100 | >100 | 1.5 | 2.0 | 2.0 | No defects |
| Comparative Experiment 9 | 1.4 cN | 1.9% | 1.2 g/l | 2.5/2.0 | >100 | >100 | 2.5 | 2.0 | 2.0 | No defects |
| Example 7 | 0.7 cN | 0.8% | 0.8 g/l | 1.5/1.0 | 26 | 74 | 1.5 | 1.0 | 1.5 | Slight defects |
| Comparative Experiment 10 | 1.8 cN | 1.1% | 1.0 g/l | 1.5/1.5 | >100 | >100 | 2.0 | 2.0 | 2.5 | Slight defects |

We claim:

1. In a magnetic recording medium obtained by preparing a dispersion comprising anisotropic magnetic material in a solution of a polymeric binder in an organic solvent, applying the dispersion as a layer to a nonmagnetizable substrate, and then orienting the anisotropic magnetic material along the intended recording direction in a magnetic field and solidifying the applied magnetic layer, the improvement wherein included in the dispersion are
   (1) a finely divided polysilicic acid rendered hydrophobic with chemically bound carbon in an amount of from 0.3 to 5% by weight, based on the amount of magnetic material,
   said water repellant polysilicic acid with chemically bound carbon having, a pH, measured in equal amounts of methanol and water, of from 7.5 to 12, and a BET surface area of from 70 to 400 $m^2/g$,
and, additionally,
   (2) a polysiloxane having a viscosity of from greater than 10,000 to 500,000 mPa.s in an amount of from 0.1 to 1.5% by weight, based on the amount of magnetic material,
whereby the smoothness, wear resistance and stability are improved.

2. A magnetic recording medium as defined in claim 1, wherein the polysilica has from 1.8 to 3.2% by weight of chemically bound carbon on the surface.

* * * * *